(No Model.)
H. E. MILLER.
MIRROR CONSTRUCTION.
No. 592,877. Patented Nov. 2, 1897.
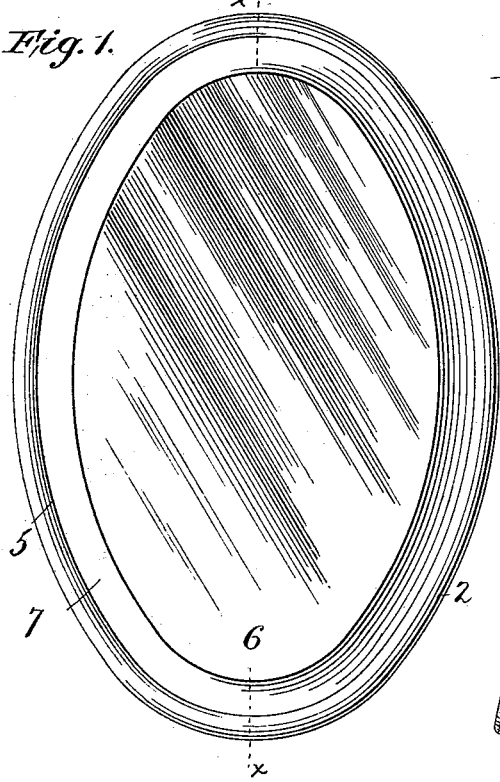
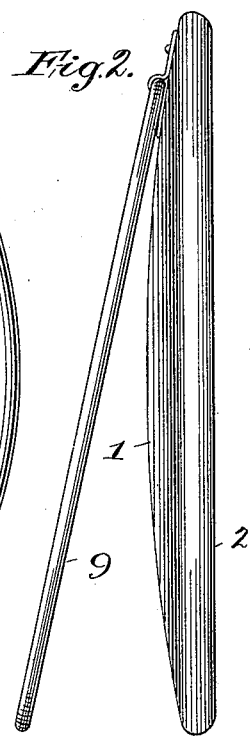
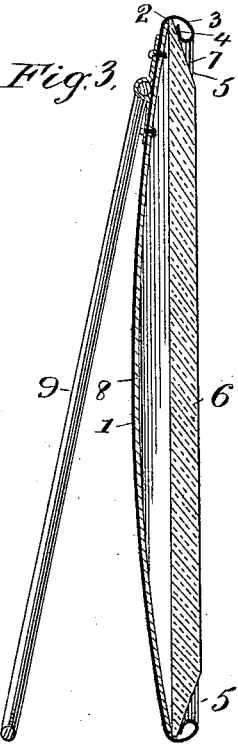
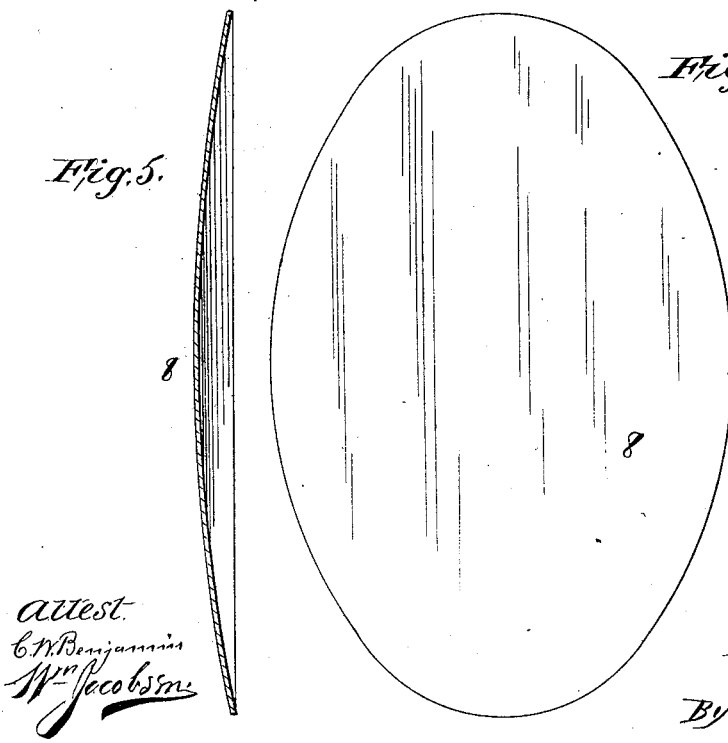
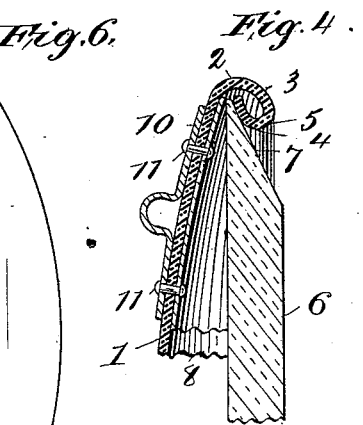
Inventor,
Horace E. Miller,

UNITED STATES PATENT OFFICE.

HORACE E. MILLER, OF NEWARK, NEW JERSEY, ASSIGNOR TO THE CELLULOID COMPANY, OF NEW YORK, N. Y., A CORPORATION OF NEW JERSEY.

MIRROR CONSTRUCTION.

SPECIFICATION forming part of Letters Patent No. 592,877, dated November 2, 1897.

Application filed June 18, 1897. Serial No. 641,297. (No model.)

*To all whom it may concern:*

Be it known that I, HORACE E. MILLER, a citizen of the United States, residing at Newark, county of Essex, and State of New Jersey, have invented certain new and useful Improvements in Mirror Constructions, of which the following is a specification.

My invention generally has relation to the construction of frames for mirrors and the like, and specifically to those having celluloid backs or frames; and it is the object of my invention to produce a light, durable, and efficient support for a mirror, and generally to improve the construction of mirror-frames.

Prior to my invention, so far as I am aware, it has been customary in the manufacture of mirror-frames to form the rim or edging which confines the mirror to the frame and the backing of one piece of material either by molding or turning. In some cases the rim has been made separately and secured to the back by screws or the like. In other instances the mirror has been secured to a suitable backing by a spun or pressed rim, the mirror being secured to the backing by pressing the edges of the rim down on the glass and backing.

In prior constructions where the front of the frame-rim bears directly against the glass or other material held in the frame a "raw edge" is produced having no appreciable cushioning capacity and exposes a cut and unfinished edge to the view which the mirror strongly accentuates.

It is the object of my invention to dispense with these methods of construction and to make the rim integrally with the back by pressing, spinning, or otherwise turning the material over at the edge or periphery of the back and to form between the backing and the exterior of the rim and within the latter a resilient abutment formed integrally with the rim and bearing on the surface of the glass to press and hold it firmly against the backing.

The rim made in accordance with my invention dispenses entirely with the raw or unfinished edge or surface of the rims usually employed in mirror constructions and produces a much neater finish in the resultant article.

My invention also has for its object to produce conformation in the back of the mirror which will simulate that of a solid-back mirror-frame, and to this end I interpose between the glass and the frame backing a lining of thin sheet metal or the like having a convex or dish-shaped configuration given to it, which when employed with a frame backing of thin yet very flexible material, as celluloid, bulges the material out, and which latter partakes of the configuration of lining, stiffening the frame backing and allowing of the body of the frame to be made of comparatively light and thin material. The employment of this lining produces another new and desirable result in that it forces the glass against the resilient abutment formed on the inside of the rim and closely seals the joint between the rim and the glass and holds the glass firmly in position.

My invention also embraces other details of construction and combination of parts hereinafter described, and further pointed out in the claims.

In the drawings forming part of this specification, Figure 1 is a front elevation of a mirror-frame constructed in accordance with my invention. Fig. 2 is a side elevation thereof. Fig. 3 is a sectional elevation on the line $x$ $x$, Fig. 1. Fig. 4 is an enlarged sectional elevation of the upper part of the frame. Fig. 5 is a side elevation of the resilient lining, and Fig. 6 a front elevation of the same.

In the drawings similar numerals of reference indicate corresponding parts throughout the several views.

I have illustrated my invention in connection with a frame having an oval configuration, but it will be apparent from the following description that my improvements can be employed on frames having other configurations and differing in many aspects from that disclosed herein. Especially is this true of the cushioned rim.

At 1 in the drawings is a backing of thin, yet flexible, material, such as celluloid and the like, and at 2 is the cushioned rim formed on its periphery. This rim consists in the annular overlapping portion 3 and the inwardly-extending curved part 4, formed integrally with the annular part 3, the part 4 constituting the resilient abutment, the inner end of which is free, giving it great flexibility. This compound rim is formed continuously around the periphery of the backing by turning, spinning, or otherwise working the material, the point of union of the parts 3 4 being unbroken, as at 5, which produces a neat finish.

At 6 is the glass or mirror, in this case having a beveled edge 7, the convex or curved surface of the abutment 4 bearing directly on the beveled edge of the glass, tending to crowd the abutment inwardly. This extension 4 is formed continuously around the frame and forms a continuous resilient abutment for the glass, but it is apparent that certain desirable results can be obtained by otherwise forming the abutment.

To stiffen the frame to force the glass, mirror, or the like against the abutment and to produce a bulging or convex appearance to the back and protect it from injury, I insert between the glass and the back of the frame a lining 8, consisting of a disk of metal or other springy material capable of holding the shape given to it, which disk is pressed or otherwise conformed to produce a resilient interlining. The disk in the present case is oval-shaped, its periphery fitting in between the glass and the back of the frame in line with the abutment, so as to still further force the glass against said abutment. The intervening lining also affords convenient means for attaching the leg 9 should it be desired to make an easel of the frame, the leg being attached to the hinge-plate 10 at the eye 10ª, which extends outwardly intermediate of the ends of the plate, pins or rivets 11 being passed from the hinge-plate through the frame-back to the interposed elastic lining, as shown, securing those three parts firmly together, confining the frame-back closely to the interposed lining and relieving the frame-back of any stress due to the affixture of the legs thereto.

Having described my invention, I claim—

1. In an article of the class described, the combination with a suitable backing, of a rim projecting down in front of the backing, a plate held within the rim, and a resilient abutment interposed between said plate and the exposed edge of the rim, said abutment bearing on the exposed surface of the plate, substantially as described.

2. In an article of the class described, the combination with the backing, a circumferential rim thereon projecting downwardly in front of the backing, a plate held within the backing and the rim, and an abutment formed by turning in the exposed edge of the rim, said turned-in portion bearing against the plate and lying between said edge and plate, substantially as described.

3. In an article of the class described, the combination with the backing, a circumferential rim thereon extending downwardly in front of the backing, a plate held within the backing and the rim, and a resilient abutment bearing on the edge of the plate, said abutment being coextensive with said plate, and formed by turning the outer or exposed edge of the rim in between said exposed edge and the backing, substantially as described.

4. As a new article of manufacture, a frame or the like comprising a backing, an annular rim formed on the periphery thereof, and an extension from said rim turned inwardly between the periphery of the rim and the backing, all the parts being integral, substantially as described.

5. The combination in an article of the class described, of the backing, the rim formed thereon, the plate within the rim, and the longitudinally-disposed elastic disk interposed between the plate and backing at the rear of said plate, said disk having a circumferential bearing against the rear of the plate pressing the plate outwardly against the rim, substantially as described.

6. The combination in an article of the class described, of the flexible backing, the rim formed integrally on the periphery of the backing and coextensive therewith, an extension of said rim formed on the edge thereof and extending inwardly between the backing and said rim, a plate abutting against said extension, and an elastic disk interposed between said plate and backing, substantially as described.

7. The combination in an article of the class described, of the backing, the annular rim formed on the periphery thereof, a plate within said rim, and a convex and springy disk interposed between the plate and backing, said disk having a peripheral bearing against the plate on one side, its convex portion distending the backing, substantially as described.

8. The combination in a backing, of the interposed metallic disk, the hinge-plate having a hinging-eye extending outwardly from between its ends, the backing, disk, and plate, being secured together by rivets passing through the pivot-plate between its ends and said eye and entirely through said disk and backing, and legs extending from said hinging-eye, substantially as described.

9. The combination with the flexible backing, the rim thereon, the plate in said rim, the dish-shaped and springy disk interposed between the rear of said plate and said backing, the dished portion of said disk abutting against the backing and having a peripheral bearing against said plate, and means for firmly securing the disk in said position, substantially as described.

10. The combination in a frame, of the backing, the annular rim formed thereon, an abutment comprising the inwardly-extending convex extension of the rim, and a plate within the rim abutting against the convex surface of said extension, substantially as described.

11. A frame composed of thin resilient material, said frame comprising a backing continuous within its periphery, and an annular and reëntrant and resilient rim integral with the backing, combined with a plate held in said rim against said reëntrant portion, substantially as described.

12. A frame having a backing of resilient material, and an annular rim integral with the backing, the free edge of which rim is circular and reëntrant and constitutes a continuation of the backing, and a plate held in said rim and bearing against the circular portion thereof, substantially as described.

13. The combination in a frame, of a backing, the annular rim formed thereon, an abutment comprising the inwardly-extending curved extension of the rim, a plate within the rim abutting against the curved face of said extension, and a resilient lining interposed between the plate and backing, substantially as described.

14. The combination in a frame, of a backing composed of thin flexible material, an integral annular rim formed on the periphery of the backing, an integral and resilient abutment consisting of the inwardly-extending curved extension of the rim, a plate within the rim bearing against the abutment, and a convex disk interposed between the plate and backing its edge alining with said abutment, substantially as described.

15. As a new article of manufacture, a frame for a mirror or the like, said frame being composed of a thin and flexible sheet of celluloid, or like material, and comprising a backing substantially continuous within its periphery, an integral rim overlapping the periphery of the backing to form an annular recess, and an integral and reëntrant extension of the rim lying between said rim and backing, substantially as and for the purposes described.

Signed at Newark, county of Essex, State of New Jersey, this 16th day of June, 1897.

HORACE E. MILLER.

Witnesses:
W. R. SMITH,
L. G. THOMSON.